US012539231B2

(12) United States Patent
Karlsson et al.

(10) Patent No.: US 12,539,231 B2
(45) Date of Patent: Feb. 3, 2026

(54) REMOVABLE LIQUID HEAT EXCHANGING ELEMENT FOR USE IN A DEVICE FOR TEMPERATURE CONTROL TREATMENT

(71) Applicant: TEQCool AB, Lund (SE)

(72) Inventors: Stina Karlsson, Lund (SE); Jonas Wahlfrid, Lund (SE); Morgan Leijström, Lund (SE)

(73) Assignee: TEQCool AB, Lund (SE)

( * ) Notice: Subject to any disclaimer, the term of this patent is extended or adjusted under 35 U.S.C. 154(b) by 48 days.

(21) Appl. No.: 17/913,445

(22) PCT Filed: Mar. 25, 2021

(86) PCT No.: PCT/EP2021/057721
§ 371 (c)(1),
(2) Date: Sep. 22, 2022

(87) PCT Pub. No.: WO2021/191340
PCT Pub. Date: Sep. 30, 2021

(65) Prior Publication Data
US 2023/0129602 A1    Apr. 27, 2023

(30) Foreign Application Priority Data

Mar. 27, 2020 (EP) .................. 20166417

(51) Int. Cl.
*A61F 7/00* (2006.01)
*A61F 7/12* (2006.01)

(52) U.S. Cl.
CPC ............ *A61F 7/0085* (2013.01); *A61F 7/123* (2013.01); *A61F 2007/0006* (2013.01); *A61F 2007/0056* (2013.01); *A61F 2007/0076* (2013.01)

(58) Field of Classification Search
CPC ...... A61F 2007/0006; A61F 2007/0056; A61F 2007/0076; A61F 7/0085; A61F 7/12; A61F 7/123
See application file for complete search history.

(56) References Cited

U.S. PATENT DOCUMENTS 5,344,436 A      9/1994  Fontenot et al.
2002/0193739 A1  12/2002 Augustine et al.
(Continued)

FOREIGN PATENT DOCUMENTS

WO    2012/017417 A2    2/2012
WO    2018/069394 A1    4/2018

OTHER PUBLICATIONS

International Search Report and Written Opinion mailed on Jun. 9, 2021, received for PCT Application PCT/EP2021/057721, filed on Mar. 25, 2021, 11 pages including English Translation.

*Primary Examiner* — Tigist S Demie
(74) *Attorney, Agent, or Firm* — Inskeep IP Group, Inc.

(57) ABSTRACT

Removable liquid heat exchanging element (100) for use in a device for temperature control treatment (400) comprising a support structure (300), and a liquid transporter (200) supported by the support structure (300). The removable liquid heat exchanging element (100) is configured to be positioned in a slot (402) in the device for temperature control treatment (400). The liquid transporter (200) comprises an inlet (201) and an outlet (206) and a lumen for liquid transportation. The lumen is at least partially enclosed by a heat exchanging portion (205) of a flexible wall configured to engage a heat exchanging surface (401a, 401b) of the device for temperature control treatment (400). The support structure (300) is configured to engage and partially enclose a portion of the liquid transporter (200) such that an occlusion (203) is formed between the inlet (Continued)

(201) and the heat exchanging portion (205) of the lumen for liquid transportation.

15 Claims, 5 Drawing Sheets

(56) References Cited

U.S. PATENT DOCUMENTS

| | | |
|---|---|---|
| 2008/0269676 A1 | 10/2008 | Bieberich et al. |
| 2015/0230975 A1* | 8/2015 | Dabrowiak ............... F28F 3/12 607/104 |

* cited by examiner

REMOVABLE LIQUID HEAT EXCHANGING ELEMENT FOR USE IN A DEVICE FOR TEMPERATURE CONTROL TREATMENT

CROSS-REFERENCE TO RELATED APPLICATIONS

The present application is based on PCT filing PCT/EP2021/057721, filed Mar. 25, 2021, which claims priority to EP 20166417.4, filed Mar. 27, 2020, the entire contents of each are incorporated herein by reference.

FIELD OF THE INVENTION

The present disclosure relates to a heat exchanger. More specifically, the disclosure relates to a removable liquid heat exchanging element for use in a device for temperature control treatment. The disclosure further relates to a system for temperature control treatment of a patient.

BACKGROUND

Heat exchangers are used in a variety of technical fields for a variety of different applications. One such application is therapeutic temperature control treatment, such as temperature control treatment, within the medical field. The body temperature, or the temperature of body parts of a human may have an important effect on a healing process and the risk of permanent damage from many pathological conditions. Therapeutic Temperature control is commonly used as an effort to improve health outcomes during recovery after a period of reduced blood flow to the brain. Periods of reduced blood flow may be due to cardiac arrest or the blockage of an artery by a clot as in the case of a stroke. Lack of blood flow and oxygen deprivation is serious as it causes permanent damage to the brain unless treatment to restore blood flow and protect nerve cells is initiated at an early stage. It is well known that cooling the brain may effectively reduce the development of cellular damage in the aftermath of oxygen deprivation. In the case of a circulatory arrest, the risk of permanent brain damage has been found to decrease if the temperature of the brain is lowered before, during or after the arrest. In the case of a brain trauma, cooling of the brain has been shown to decrease the risk of traumatic brain injury in certain patient categories. Cooling of the brain has also been shown to have positive effects on other illnesses such as migraine.

There are several known methods to cool single organs such as the brain. One example is shown and described in PCT publication WO 2005/087156 (to Lunderqvist et al.). The document discloses a system for cerebral temperature control of a human being comprising a double lumen catheter to be inserted through the nostril of a human. The double lumen catheter comprises expandable balloons. This method, utilizing the brain access which can be obtained via the nasal cavity for heat exchange with the brain, is often referred to as nasopharyngeal cooling. The double lumen catheter comprises a cooling fluid which, via inlet and outlet tubes are connected to a reservoir comprising a larger volume of cooling fluid. Relevant background art can be found in US 2015/230975 A1, US 2002/193739 A1, US 2008/269676 A1, WO 2012/017417 A2 and in WO 2018/069394 A1.

SUMMARY

According to a first aspect, a removable liquid heat exchanging element for use in a device for temperature control treatment. The removable liquid heat exchanging element comprises a support structure, and a liquid transporter for enclosing and transporting a liquid. The liquid transporter is supported by the support structure. The removable liquid heat exchanging element is configured to be positioned in a slot in the device for temperature control treatment. The liquid transporter comprises an inlet and an outlet and a lumen for liquid transportation placed between the inlet and the outlet. The inlet and outlet are positioned at a first portion of the removable liquid heat exchanging element, such that the inlet and outlet can be accessed from the same side of the device for temperature control treatment. The lumen is at least partially enclosed by a heat exchanging portion of a flexible wall configured to engage a heat exchanging surface av of the device for temperature control treatment. A portion of the lumen for liquid transportation is in fluid connection with the flexible wall and forms a heat exchanging portion of the lumen. The support structure is configured to engage and partially enclose a portion of the liquid transporter such that an occlusion is formed between the inlet and the heat exchanging portion of the lumen for liquid transportation. The occlusion has the effect that liquid may be distributed such that it enters the heat exchanging portion throughout the length of the occlusion. This means that the liquid flows evenly over the heat exchanging portion, which means that heat exchange can take place over an entire surfaces of the heat exchanging portion which is in contact with a heat exchanging surface of a device for temperature control treatment.

According to one embodiment, the first portion of the removable liquid heat exchanging element is configured to be visible in the slot.

According to one embodiment, the slot in the device for temperature control treatment extends vertically, and the inlet is configured to be positioned at the lower end of the vertical slot, and the outlet is configured to be positioned at the upper end of the vertical slot, such that the liquid exits the liquid transporter higher than it enters the liquid transporter. When the system if filled with liquid for the first time (primed), vertical installment efficiently pushes all air present in the system upwards from the inlet to the outlet, which creates an efficient fill and reduces that chance that bubbles are trapped in the system, bubbles which may reduce the heat transfer efficiency.

According to one embodiment, the support structure or the liquid transporter is configured to form a slanted lower edge of the liquid transporter, such that the liquid can flow from the inlet, along the slanted lower edge, upwards towards the heat exchanging portion of the lumen. The support structure or the liquid transporter may further be configured to form a slanted upper edge of the liquid transporter, such that the liquid flows from the heat exchanging portion of the lumen along the slanted upper edge upwards the outlet. As the liquid transporter has slanted lower and upper edges, the liquid will flow from the inlet, upwards along the slanted lower edge through the heat exchanging portion to the slanted upper edge of the liquid transporter and out though the outlet. In embodiments where the removable liquid heat exchanging element is positioned in a vertical slot, when the system if filled with liquid for the first time (primed), the slanted edges efficiently pushes all air present in the system upwards from the inlet to the outlet, which creates an efficient fill and reduces that chance that bubbles are trapped in the system, bubbles which may reduce the heat transfer efficiency.

According to one embodiment, the removable liquid heat exchanging element is rectangular, and a first short side of the rectangular removable liquid heat exchanging element comprises the inlet and the outlet. The liquid transporter comprises a lower edge along a first long side of the rectangular removable liquid heat exchanging element and an upper edge along a second long side of the rectangular removable liquid heat exchanging element. The support structure is configured to engage and partially enclose a portion of the liquid transporter alongside, but at a distance from, the lower and upper edges such that an elongated occlusion in the form of a gap between portions of the flexible wall is formed between the inlet and the heat exchanging portion of the lumen for liquid transportation and between the heat exchanging portion of the lumen and the outlet.

According to one embodiment, the flexible wall of the liquid transporter is configured to form a tube between the inlet and the gap. The gap runs alongside and opens up an open portion of the tube such that the gap forms the occlusion between the open portion of the tube and the heat exchanging portion. The gap may be in the range 0.5 mm-3 mm, preferably in the range 0.5 mm-2 mm and preferably below 1 mm.

The tube and the occluding gap have the effect that the liquid flowing through the tube is distributed along the entire length of the tube and as such enters the heat exchanging portion throughout the length of the occlusion. This means that the liquid flows evenly over the heat exchanging portion which means that heat exchange can take place over the entire surfaces of the heat exchanging portion which are in contact with heat exchanging surfaces of the device for temperature control.

The open portion of the removable liquid heat exchanging element may have a C-shaped cross section.

The removable liquid heat exchanging element may further comprise a flexible holding device integrated in the support structure. The flexible holding device may be configured to engage a portion of the device for temperature control treatment for fixating the removable liquid heat exchanging element in the slot.

The flexible holding device enables simple manual manipulation of the removable liquid heat exchanging element for removing and replacing the removable liquid heat exchanging element.

The removable liquid heat exchanging element may comprise at least one of the slanted lower and upper edges of the liquid transporter is formed by the support structure pressing on the flexible wall. In the alternative, or in combination, the slanted lower and upper edges of the liquid transporter may be formed by the shape of the flexible wall.

The liquid transporter may comprise a polymer sheet material which may be welded to form a suitable shape of the lumen.

A device for temperature control treatment is further provided. The device comprises a Peltier element and a slot in the device for temperature control treatment for accessing a heat exchanging surface in connection with the Peltier element. The device for temperature control treatment further comprises a removable liquid heat exchanging element according to any one of the embodiments herein.

The primary advantages of Peltier element based heat pumps are the lack of moving parts or circulating liquid which means that they have a very long life, are invulnerable to leaks, and can be made in basically all shapes.

The device for temperature control treatment may further comprise at least one patient engaging heat exchanging element configured to be inserted into the nasal cavity of a patient for administrating temperature control treatment and tubing for connecting the patient engaging heat exchanging element to the removable liquid heat exchanging element.

BRIEF DESCRIPTIONS OF THE DRAWINGS

The inventive concept will by way of example be described in more detail with reference to the appended schematic drawings, which shows presently preferred embodiments.

DETAILED DESCRIPTION

The present invention will now be described more fully hereinafter with reference to the accompanying drawings, in which currently preferred embodiments are shown. This invention may, however, be embodied in many different forms and should not be construed as limited to the embodiments set forth herein; rather, these embodiments are provided for thoroughness and completeness, and fully convey the scope of the invention to the skilled person.

The inventive concept relates to a removable liquid heat exchanging element for use in a device for temperature control treatment of a patient.

Figure 1:
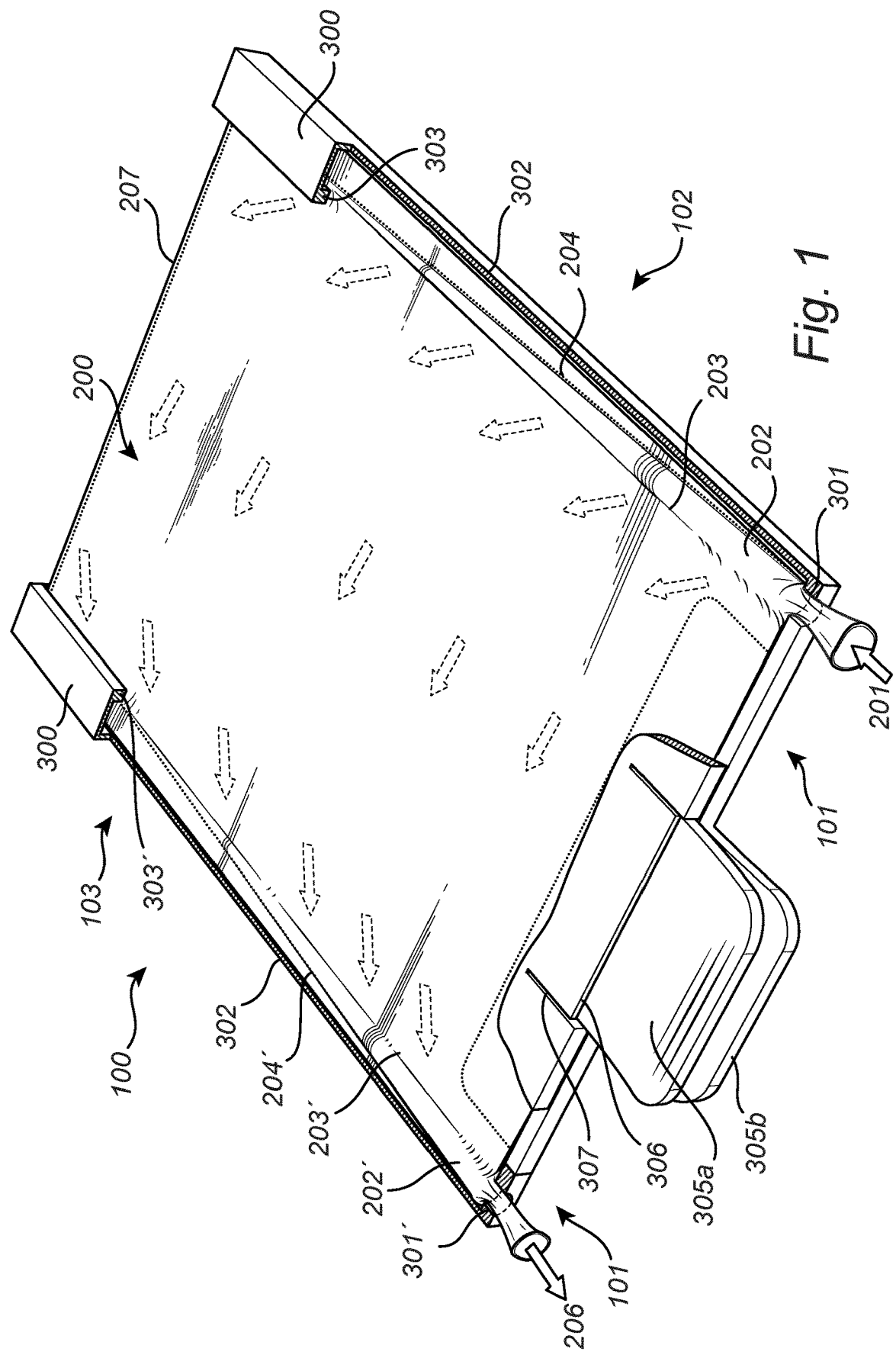
FIG. 1 shows an embodiment of a removable liquid heat exchanging element in an elevated perspective view.

FIG. 1 shows an embodiment of a removable liquid heat exchanging element 100 in an elevated perspective view. The removable liquid heat exchanging element 100 comprises a support structure 300, which in the embodiment shown in FIG. 1 is a frame made from a polymer material. The removable liquid heat exchanging element 100 further comprises a liquid transporter 200, which in the embodiment shown in FIG. 1 is a flexible liquid container made from a flexible polymer sheet material, similar to a plastic bag. The liquid transporter 200 is configured for enclosing and transporting a liquid for temperature control treatment of the patient and is supported by the support structure 300. The liquid transporter 200 could for example be made from a polyvinylchloride (PVC) sheet which may include a lipophilic plasticizer such as DEHP.

Figure 4A:
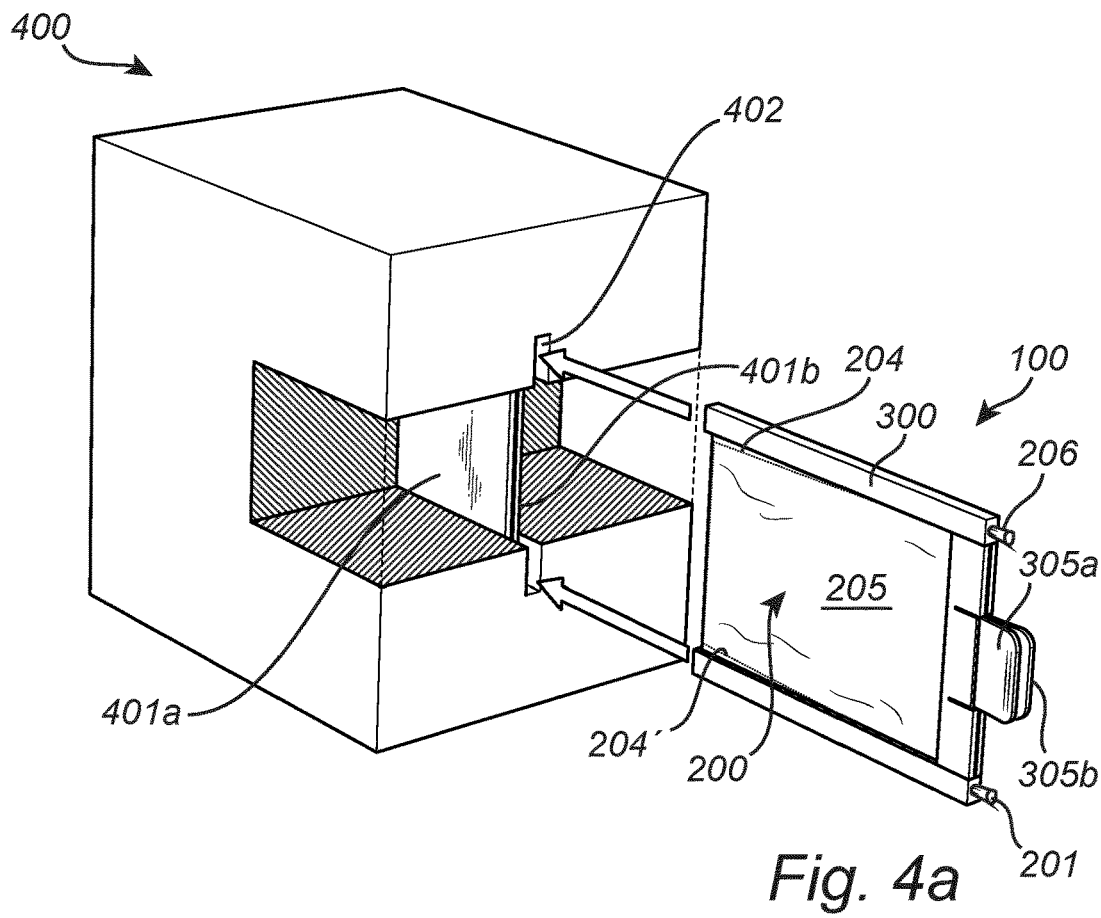
FIG. 4a shows a device for temperature control treatment in an elevated perspective view.
Figure 4B:
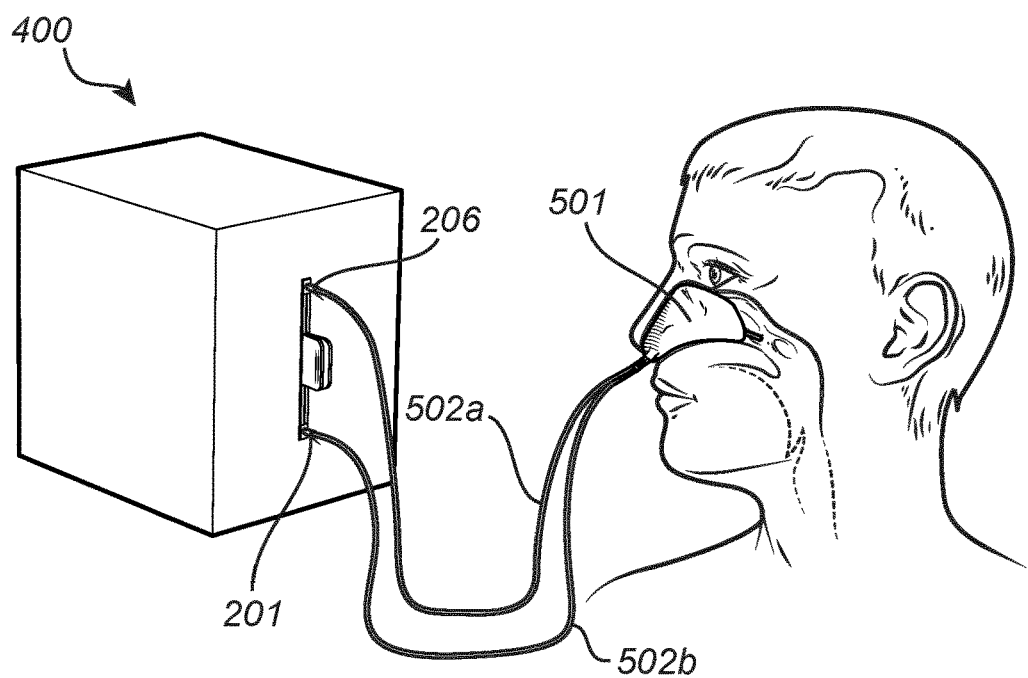
FIG. 4b shows the device for temperature control treatment according to the embodiment shown in FIG. 4a, when connected to patient engaging heat exchanging elements.

The removable liquid heat exchanging element 100 is configured to be positioned in a slot in the device for temperature control treatment such that a first portion 101 of the removable liquid heat exchanging element 100 is visible in the slot (further shown with reference to FIGS. 4A and 4B). The liquid transporter 200 comprises an inlet 201 and an outlet 206 and a lumen for liquid transportation placed between the inlet 201 and the outlet 206 and enclosed by the flexible polymer sheet material. Both the inlet 201 and the outlet 206 is positioned at the first portion 101 of the removable liquid heat exchanging element 100 (when the removable liquid heat exchanging element 100 is positioned in the device for temperature control treatment), such that the inlet 201 and outlet 206 can be accessed from the same side of the device for temperature control treatment. The lumen is at least partially enclosed by a heat exchanging portion of a flexible wall of the liquid transporter 200, which in the embodiment shown in FIG. 1 is made from a flexible polymer sheet material configured to engage a heat exchanging surface of the device for temperature control treatment (as shown in FIG. 4a). A portion of the lumen for liquid transportation is in fluid connection with the flexible wall and forms a heat exchanging portion 205 of the lumen, in which the liquid in the lumen is heated or cooled by the heat exchanging surface of the device for temperature control treatment.

The support structure 300 is configured to engage and partially enclose a portion of the liquid transporter 200 such that an occlusion 203 is formed between the inlet 201 and the heat exchanging portion 205 of the lumen for liquid transportation.

The support structure 300 may be configured to engage and partially enclose a portion of the liquid transporter 200 alongside, but at a distance from, a lower 102 and an upper 103 edge of the removable liquid heat exchanging element 100 such that an elongated occlusion 203 in the form of a gap is formed between portions of the flexible wall between the inlet 201 and the heat exchanging portion 205 of the lumen for liquid transportation.

Further, an occlusion 203' in the form of a gap may be formed between the heat exchanging portion 205 of the lumen and the outlet 206.

The flexible wall of the liquid transporter 200 may be configured to form a tube 202 between the inlet 201 and the occlusion in the form of a gap 203. The gap 203 runs along side and opens up an open portion of the tube (further shown with reference to FIG. 3) such that the gap 203 forms the occlusion 203 between the open portion of the tube and the heat exchanging portion 205.

Starting from the first portion 101 of the removable liquid heat exchanging element 100, liquid may enter the removable liquid heat exchanging element 100 through the inlet 201 and flow into the lumen of the liquid transporter 200 through a hole 301 in the support structure 300. The liquid transporter 200 may as mentioned form a tube 202 enclosed by a support structure wall 302 (as seen in cross-section in FIG. 3) and the tube may be restricted on one side by a slanted weld 204 along the lower edge 102 of the first long side of the rectangular removable liquid heat exchanging element 100 and on the other side by a restricting portion 303 of the support structure 300 which creates an occlusion 203 in the form of a gap running parallel to the wall 302 of the support structure 300 alongside the lower edge 102 of the removable liquid heat exchanging element 100 along the entire length of the liquid transporter 200.

The liquid that has flowed into the tube 202 formed by the flexible wall of the liquid transporter 200 is pressed through the occlusion 203 and into the heat exchanging portion 205 of the flexible wall of the liquid transporter 200. In the heat exchanging portion 205, the liquid in the lumen of the heat exchanging portion 205 may be heated or cooled by a heat exchanging surface of the device for temperature control treatment (shown in FIG. 4a).

The liquid may continue through an identical occlusion 203' in the form of a gap running parallel to the wall 302 of the support structure alongside an upper edge 103 along the entire length of the liquid transporter 200 and further into an upper tube 202' which is identically restricted on one side by a slanted weld 204' running along the upper edge 103 of the second long side of the removable liquid heat exchanging element 100 and on the other side by a restricting portion 303' of the support structure 300.

The liquid may then flow through the tube 202' exiting the support structure 300 through a hole in the support structure 301' and exits through the outlet 206.

In the embodiment shown in FIG. 1, the first portion 101 of the removable liquid heat exchanging element 100 is configured to be visible in the slot when the removable liquid heat exchanging element 100 is positioned in the slot.

In the embodiment shown in FIG. 1, the removable liquid heat exchanging element 100 is rectangular. However the disclosure herein is not limited to a rectangular removable liquid heat exchanging element 100. For instance, one or more cylindrical heat exchangers using cylindrically shaped core elements may be used in the system, whereby the removable liquid heat exchanging element 100 may be shaped accordingly. A first short side of the rectangular removable liquid heat exchanging element comprises the first portion 101 comprising the inlet 201 and the outlet 206. The removable liquid heat exchanging element 100 comprises a lower edge 102 along a first long side of the rectangular removable liquid heat exchanging element 100 and an upper edge 103 along a second long side of the rectangular removable liquid heat exchanging element 100. The support structure 300 is configured to engage and partially enclose a portion of the liquid transporter 200 alongside, but at a distance from, the lower 102 and upper 103 edges such that an elongated occlusion 203 in the form of a gap is formed between portions of the flexible wall between the inlet 201 and the heat exchanging portion 205 of the lumen for liquid transportation. Further, an occlusion 203' in the form of a gap is formed between the heat exchanging portion 205 of the lumen and the outlet 206.

In the embodiment shown in FIG. 1, the liquid transporter 200 is configured to form a slanted lower edge 204 of the liquid transporter 200, such that the liquid can flow from the inlet 201, along the slanted lower edge 204 upwards towards the heat exchanging portion 205 of the lumen. Further, the liquid transporter 200 is configured to form a slanted upper edge 204' of the liquid transporter 200, such that the liquid can flow from the heat exchanging portion 205 of the lumen along the slanted upper edge 204' upwards the outlet 206. The slanted lower and upper edges 204, 204' of the liquid transporter 200 is formed by the shape of the flexible wall and in the embodiment shown in FIG. 1, the slanted lower and upper edges 204, 204' of the liquid transporter 200 is formed by a weld in the flexible wall of the liquid transporter 200.

In the embodiment shown in FIG. 1, the flexible wall of the liquid transporter 200 is configured to form a tube 202 between the inlet 201 and the occlusion in the form of a gap 203. The gap 203 runs along side and opens up an open portion of the tube (further shown with reference to FIG. 3) such that the gap 203 forms the occlusion 203 between the open portion of the tube and the heat exchanging portion 205. In the embodiment shown in FIG. 1, the open portion of the tube has a C-shaped cross section.

In the embodiment shown in FIG. 1, the removable liquid heat exchanging element 100 further comprises a flexible holding device 305a, 305b, 306, 307 integrated in the support structure 300. The flexible holding device 305a, 305b, 306, 307 is configured to engage a portion of the device for temperature control treatment (as shown in FIG. 4b) for fixating the removable liquid heat exchanging element 100 in the slot. The flexible holding device comprises two handling elements 305a, 305b which are adapted to be moved towards each other by means of manual force. The two handling elements 305a, 305b are each connected to a locking edge 306 (an identical locking edge being located on the side of the removable liquid heat exchanging element which can not be seen in FIG. 1) which is configured to engage a corresponding edge in the slot in the device for temperature control treatment for locking the removable liquid heat exchanging element 100 in the slot. The two handling elements 305a, 305b and the locking edge(s) 306 are integrated in the same piece of polymer material as the rest of the support structure 300 and are flexible in relation to the rest of the support structure by means of slits 307 in the material of the support structure which increases the flexibility of the two handling elements 305a, 305b and the locking edge(s) 306.

Starting from the first portion 101 of the removable liquid heat exchanging element 100, liquid enters the removable liquid heat exchanging element 100 through the inlet 201 and flows into the lumen of the liquid transporter 200 through a hole 301 in the support structure 300. The liquid transporter 200 forms a tube 202 enclosed by a support structure wall 302 (as seen in cross-section in FIG. 3) and the tube is restricted on one side by a slanted weld 204 along the lower edge 102 of the first long side of the rectangular removable liquid heat exchanging element 100 and on the other side by a restricting portion 303 of the support structure 300 which creates an occlusion 203 in the form of a gap running parallel to the wall 302 of the support structure 300 alongside the lower edge 102 of the removable liquid heat exchanging element 100 along the entire length of the liquid transporter 200.

The liquid that has flowed into the tube 202 formed by the flexible wall of the liquid transporter 200 is pressed through the occlusion 203 and into the heat exchanging portion 205 of the flexible wall of the liquid transporter 200. In the heat exchanging portion 205, the liquid in the lumen of the heat exchanging portion 205 is heated or cooled by a heat exchanging surface of the device for temperature control treatment (shown in FIG. 4a). The liquid continues through an identical occlusion 203' in the form of a gap running parallel to the wall 302 of the support structure alongside an upper edge 103 along the entire length of the liquid transporter 200 and further into an upper tube 202' which is identically restricted on one side by a slanted weld 204' running along the upper edge 103 of the second long side of the rectangular removable liquid heat exchanging element 100 and on the other side by a restricting portion 303' of the support structure 300. The liquid then flows through the tube 202' exiting the support structure 300 through a hole in the support structure 301' and exits through the outlet 206.

The second short edge of the rectangular removable liquid heat exchanging element 100 comprises the entry edge 207 of the liquid transporter 200 which is configured to enter the slot in the device for temperature control treatment and enter the gap between the heat exchanging surfaces of the device for temperature control treatment (shown in FIG. 4a).

Figure 2:
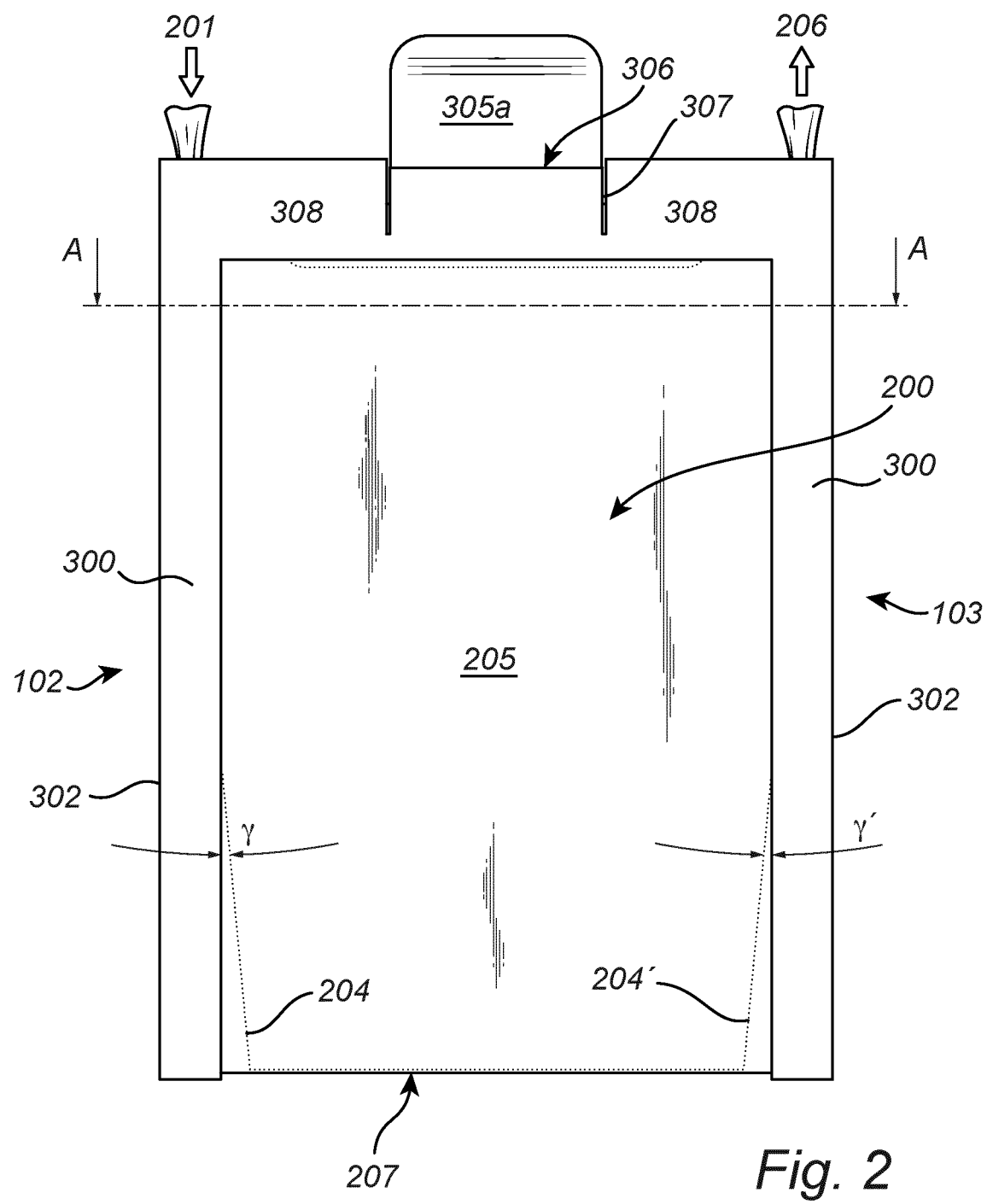
FIG. 2 shows an embodiment of a removable liquid heat exchanging element from above.

FIG. 2 shows the removable liquid heat exchanging element 100 in a top view showing the support structure 300 having walls 302 running along the lower and upper edges 102, 103 respectively. The two long sides of the support structure 300 is connected by means of the short side 308 of the support structure 300. In the embodiment shown in FIG. 2, the short side 308 and the two long sides having walls 302 defining the edges of the support structure 300, are made from, and integrated in, the same piece of polymer material, which further comprises the flexible holding device 305a, 305b, 306, 307. As can be seen in FIG. 2, the support structure 300 creates a frame with one open side for the liquid transporter 200, such that the liquid transporter 200 is supported by the support structure 300 such that the heat exchanging portion 205 is kept flat for optimizing the connection between the heat exchanging portion 205 and heat exchanging surfaces of the device for temperature control treatment (shown in FIG. 4a) creating an optimal heat exchange between the heat exchanging surfaces and the liquid flowing in the liquid transporter 200.

The support structure 300 is preferably made from a relatively stiff polymer material such as a thermoplastic material or (Ultra)High Density Polyethylene ((U)HDPE).

In FIG. 2, a top view of how the inlet 201 and outlet 206 is located in relation to the support structure can also be seen.

FIG. 2, also shows the slanted lower edge 204 and the slanted upper edge 204' of the liquid transporter 200, such that the liquid can flow from the inlet 201, along the slanted lower edge 204 through the heat exchanging portion 205 to the slanted upper edge 204' of the liquid transporter 200. The slanted lower and upper edges 204, 204' of the liquid transporter 200 is formed by a weld in the flexible wall of the liquid transporter 200. The slanted lower edge 204 and the slanted upper edge 204' of the liquid transporter 200 have angles y in relation to the upper and lower edges 102, 103 and the walls 302 of the support structure 300. In the embodiment shown in FIG. 2, the angles y are angles in the range 1°-5°, however, in alternative embodiments, the angles are angles in the range 1°-10° or 1°-15° or 1°-20°.

Figure 3:
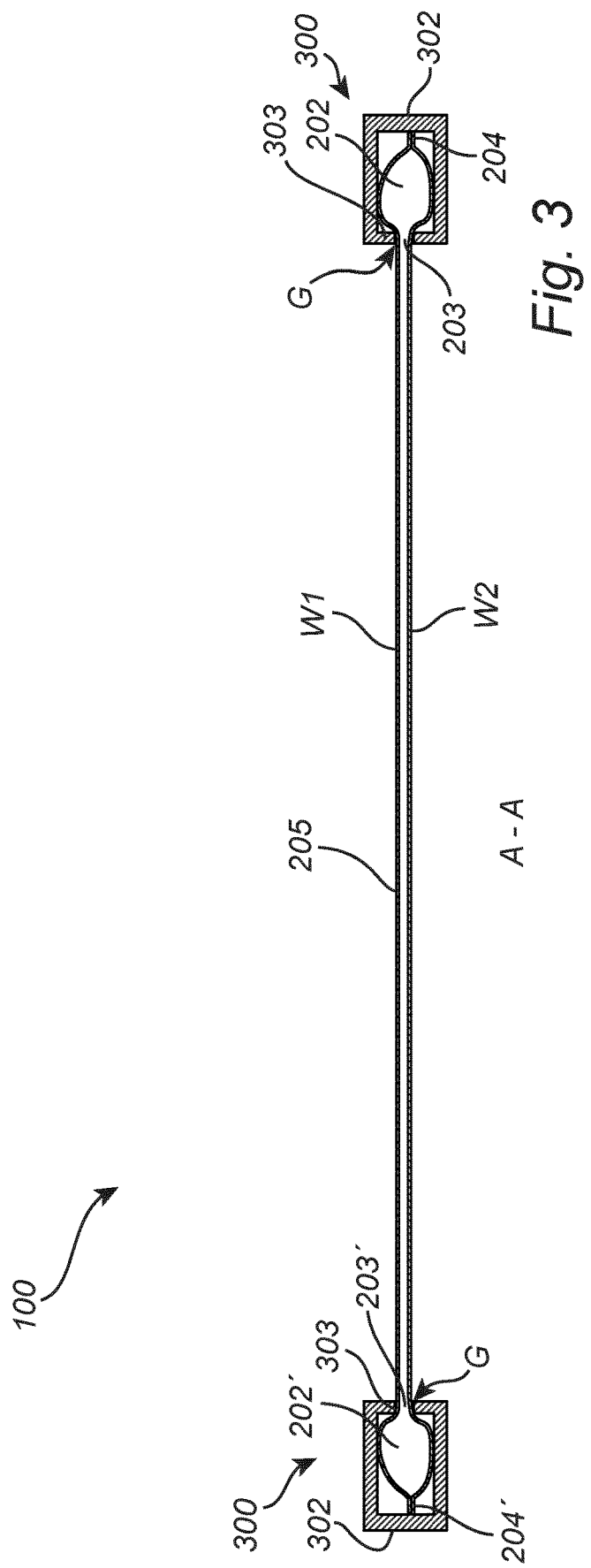
FIG. 3 shows a cross-sectional view if an embodiment of a removable liquid heat exchanging element.

FIG. 3 shows a section A-A of the rectangular removable liquid heat exchanging element 100 shown in FIGS. 1 and 2. In the cross section, the open tube 202 proving a lumen for liquid flow formed by an upper and lower flexible wall W1, W2 comprised of a polymer sheet material is clearly shown. It is also shown how the open tube 202 portion of the liquid transporter 200 is enclosed by the support structure wall 302 and how the open tube portion 202 is restricted on the outer sides by slanted welds edges 204, 204' in the form of slanted welds connecting the upper and lower flexible walls W1, W2. It is further shown how the open tube portions are restricted on the inner sides by restricting portions 303, 303' of the support structure 300 creating occlusions 203, 203' in the form of a gaps G running parallel to the wall 302 of the support structure 300. In the embodiment shown in FIG. 3, the gap G is in the range 0.5 mm-3 mm, preferably in the range 0.5 mm-2 mm and preferably below 1 mm. The occluding gap G has the effect that the liquid flowing through the tube 202 is distributed along the entire length of the tube 202 and as such enters the heat exchanging portion 205 throughout the length of the occlusion 203. This means that the liquid flows evenly over the heat exchanging portion 205 which means that heat exchange can take place over the entire surfaces of the heat exchanging portion 205 which is in contact with heat exchanging surfaces of the device for temperature control treatment (shown in FIG. 4a).

FIG. 4a shows a device for temperature control treatment 400 in an elevated perspective view. The device comprises a slot 402 into which the rectangular removable liquid heat exchanging element 100 described with reference to FIG. 1-3 or 5 are insertable. The slot 402 comprises a first and a second heat exchanging surface 401a, 401b, which in the embodiment shown in FIG. 4a are in direct connection with Peltier elements for thermoelectric cooling. The Peltier elements are solid-state active heat pumps which transfer heat from one side of the device to the other, with consumption of electrical energy, depending on the direction of the current. The Peltier elements can be used either for heating or for cooling depending on the direction of the current, and as such it is possible to transfer both cooling and heating using the heat exchanging surfaces 401a, 401b. The primary advantages of a Peltier element based heat pumps are the lack of moving parts or circulating liquid which means that they have a very long life, are invulnerable to leaks, and can be made in basically all shapes. In alternative embodiments it is however conceivable that the Peltier elements are replaced by another type of heat pump, such as for example a vapor-compression refrigerator. A gap is formed between the first and second heat exchanging surfaces 401a, 401b, into which the liquid transporter 200 is configured to be inserted, such that the heat exchanging portion 205 can engage the first and second heat exchanging surfaces 401a, 401b tightly for the creation of an efficient heat transfer. In the embodiment shown in FIG. 4a, the gap is in the range 0.5 mm-3 mm, preferably in the range 0.5 mm-2 mm and preferably below 1 mm.

In the embodiment shown in FIG. 4a, the slot 402 in the device for temperature control treatment 400 extends vertically, and the inlet 201 is configured to be positioned at the lower end of the vertical slot 402, and the outlet 406 is configured to be positioned at the upper end of the vertical slot 402, such that the liquid exits the liquid transporter higher than it enters the liquid transporter. As the liquid transporter has slanted lower 204 and upper 204' edges, the liquid will flow from the inlet 201, upwards along the slanted lower edge 204 through the heat exchanging portion 205 to the slanted upper edge 204' of the liquid transporter 200 and out though the outlet 206. When the system if filled with liquid for the first time (primed), the slanted edges 204, 204' efficiently pushes all air present in the system upwards from the inlet 201 to the outlet 206, which creates an efficient fill and reduces that chance that bubbles are trapped in the system, bubbles which may reduce the heat transfer efficiency.

FIG. 4b shows the device for temperature control treatment 400 according to the embodiment shown in FIG. 4a. In the embodiment shown in FIG. 4b, device for temperature control treatment 400 is connected to patient engaging heat exchanging elements 501, in the form of balloon catheters, configured to be inserted into the nasal cavity of a patient for administrating temperature control treatment. The balloon catheters and the temperature control treatment are further described for in example U.S. Pat. No. 7,189,253 (to Lunderqvist et al.). Tubing 502a, 502b connects the patient engaging heat exchanging elements 501 to the device for temperature control treatment 400, such that cooled liquid (if the device for temperature control treatment is used for cooling) passes from the outlet 206 in the liquid transporter via a first tube 502a to the patient engaging heat exchanging element 501 and further via a second tube 502b to the inlet 201 in the liquid transporter in which the fluid is cooled. As can be seen in FIG. 4b, the first portion (101 in FIGS. 1-3) remains visible when the removable liquid heat exchanging element is positioned in the vertical slot in the device for temperature control treatment 400.

Figure 5:
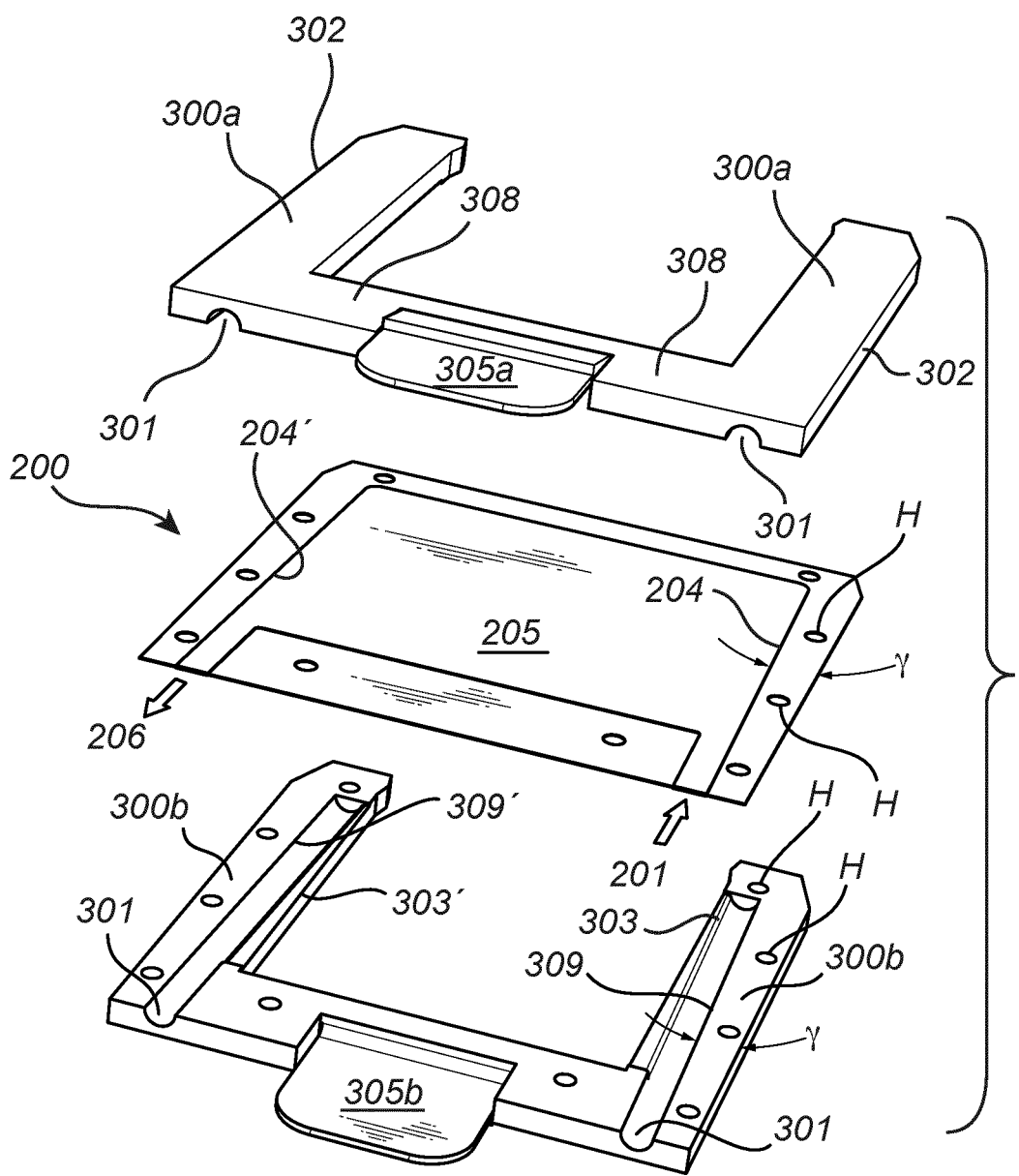
FIG. 5 shows an alternative embodiment of the removable liquid heat exchanging element in an exploded view.

FIG. 5 shows an alternative embodiment of the removable liquid heat exchanging element in an exploded view. The embodiment of the removable liquid heat exchanging element is similar to the embodiment shown in FIGS. 1-3, but with the difference that the support structure 300 comprises slanted lower 309 and upper 309' edges pressing on the flexible wall of the liquid transporter 200 and thus aiding in the formation of slanted restricting edges 204, 204' in the liquid transporter 200.

Starting from above in the figure, the support structure 300 comprises a first upper portion of the support structure 300a having walls 302 running along the lower and upper edges (as seen when the removable liquid heat exchanging element is positioned in the vertical slot in the device for temperature control treatment shown in FIGS. 4a and 4b). The two long sides of the upper portion of the support structure 300a is connected by means of the short side 308 of the support structure 300a. In the embodiment shown in FIG. 5, the short side 308 and the two long sides have walls 302 defining the edges of the upper portion support structure 300a, are made from, and integrated in, the same piece of polymer material. The same piece of polymer material further comprises the flexible holding device 305a, 305b (being identical to the flexible holding device described in the embodiment of FIGS. 1-3). As can be seen in FIG. 5, the liquid transporter 200 is pressed between the upper 300a and lower 300b portions of the support structure such that a frame with one open side is created supporting the liquid transporter 200 such that the heat exchanging portion 205 is kept flat for optimizing the connection between the heat exchanging portion 205 and heat exchanging surfaces of the device for temperature control treatment (shown in FIG. 4a) creating an optimal heat exchange between the heat exchanging surfaces and the liquid flowing in the liquid transporter 200.

In the embodiment shown in FIG. 5, the liquid transporter 200 comprises through holes H, the lower 300b portion of the support structure comprises corresponding blind holes H, whereas the upper portion of the support structure comprises protruding cylindrical elements (not shown) which are configured to engage the through holes H and blind holes H for fixating the upper 300a and lower 300b portions of the support structure 300 as well as the liquid transporter in relation to each other.

In the embodiment shown in FIG. 5, both the support structure 300 and the liquid transporter 200 comprises slanted edges 309, 309', 204, 204' aiding in making a bubble free priming of the system. The slanted edges 309, 309', 204, 204' of the support structure and liquid transporter 200 gives the result that the liquid transporter 100 gets a frustum conical lumen as seen from above in FIG. 5. Liquid enters the liquid transporter 200 at the inlet 201, which is positioned in a hole 301 in the support structure 300, and is pressed through the lower gap created between the restricting portions 303 of the upper 300a and lower 300b portions of the support structure 300, through the heat exchanging portion 205, through the upper gap created between the restricting portions 303' of the upper 300a and lower 300b portions of the support structure.

The slanted edges 309, 309', 204, 204' of the support structure and liquid transporter have angles y in relation to the walls 302 of the support structure 300. In the embodiment shown in FIG. 5, the angles y are angles in the range 1°-5°, however, in alternative embodiments, the angles are angles in the range 1°-10° or 1°-15° or 1°-20°.

The embodiments herein are not limited to the above described examples. Various alternatives, modifications and equivalents may be used. For example, one or more cylindrical heat exchangers using cylindrically shaped core elements may be used in the system. This disclosure should therefore not be limited to the specific form set forth herein. This disclosure is limited only by the appended claims and other embodiments than the mentioned above are equally possible within the scope of the claims.

The invention claimed is:
1. Removable liquid heat exchanging element for use in a device for temperature control treatment, the removable liquid heat exchanging element comprising:

a support structure, and a liquid transporter for enclosing and transporting a liquid, the liquid transporter being supported by the support structure, wherein:

the removable liquid heat exchanging element is configured to be positioned in a slot in the device for temperature control treatment, the liquid transporter comprises an inlet and an outlet and a lumen for liquid transportation placed between the inlet and the outlet, the inlet and outlet being positioned at a first portion of the removable liquid heat exchanging element, such that the inlet and outlet can be accessed from the same side of the device for temperature control treatment, the lumen for liquid transportation is at least partially enclosed by a heat exchanging portion of a flexible wall configured to engage a heat exchanging surface of the device for temperature control treatment, wherein a portion of the lumen for liquid transportation is in fluid connection with the flexible wall and forms a heat exchanging portion of the lumen, and the support structure is configured to engage and partially enclose a portion of the liquid transporter such that an occlusion is formed between the inlet and the heat exchanging portion of the lumen for liquid transportation, wherein the flexible wall is configured to form a tube between the inlet and the occlusion in the form of a gap, the gap runs alongside and opens up an open portion of the tube such that the gap forms the occlusion between the open portion of the tube and the heat exchanging portion.

2. The removable liquid heat exchanging element according to claim 1, wherein the support structure or the liquid transporter is configured to form a slanted lower edge of the liquid transporter, such that the liquid can flow from the inlet, along the slanted lower edge upwards towards the heat exchanging portion of the lumen.

3. The removable liquid heat exchanging element according to claim 1, wherein the support structure or the liquid transporter is configured to form a slanted upper edge of the liquid transporter, such that the liquid flows from the heat exchanging portion of the lumen along the slanted upper edge upwards the outlet.

4. The removable liquid heat exchanging element according to claim 1, wherein the removable liquid heat exchanging element is rectangular, and wherein:

a first short side of the rectangular removable liquid heat exchanging element comprises the inlet and the outlet, the liquid transporter comprises a lower edge along a first long side of the rectangular removable liquid heat exchanging element, the liquid transporter comprises an upper edge along a second long side of the rectangular removable liquid heat exchanging element, and the support structure is configured to engage and partially enclose a portion of the liquid transporter alongside, but at a distance from, the lower and upper edges such that an elongated occlusion in the form of a gap between portions of the flexible wall is formed between:

the inlet and the heat exchanging portion of the lumen for liquid transportation, and the heat exchanging portion of the lumen and the outlet.

5. The removable liquid heat exchanging element according to claim 4, wherein the open portion of the tube has a C-shaped cross section.

6. The removable liquid heat exchanging element according to claim 1, wherein the removable liquid heat exchanging element further comprises a flexible holding device integrated in the support structure, and wherein the flexible holding device is configured to engage a portion of the device for temperature control treatment for fixating the removable liquid heat exchanging element in the slot.

7. The removable liquid heat exchanging element according to claim 2, wherein at least one of the slanted lower and upper edges of the liquid transporter is formed by the support structure pressing on the flexible wall.

8. The removable liquid heat exchanging element according to claim 2, wherein at least one of the slanted lower and upper edges of the liquid transporter is formed by the shape of the flexible wall.

9. The removable liquid heat exchanging element according to claim 1, wherein the liquid transporter comprises a polymer sheet material.

10. The removable liquid heat exchanging element according to claim 4, wherein the gap is in the range 0.5 mm-3 mm.

11. A device for temperature control treatment, the device comprising:

a Peltier element, a slot in the device for temperature control treatment for accessing a heat exchanging surface in connection with the Peltier element, and the removable liquid heat exchanging element according to claim 1 positioned in the slot.

12. The device according to claim 11, wherein the first portion of the removable liquid heat exchanging element is configured to be visible in the slot.

13. The device according to claim 11, wherein the slot in the device for temperature control treatment extends vertically, and wherein:

the inlet is configured to be positioned at the lower end of the vertical slot, and the outlet is configured to be positioned at the upper end of the vertical slot, such that the liquid exits the liquid transporter higher than it enters the liquid transporter.

14. The device according to claim 11, further comprising:

at least one patient engaging heat exchanging element configured to be inserted into a nasal cavity of a patient for administrating temperature control treatment, and tubing for connecting the patient engaging heat exchanging element to the removable liquid heat exchanging element.

15. The device according to claim 11, further comprising:

at least one patient engaging heat exchanging element configured to be inserted into a nasal cavity of a patient for administrating temperature control treatment, and tubing for connecting the patient engaging heat exchanging element to the removable liquid heat exchanging element.

* * * * *